April 5, 1955     J. H. INGERSOLL     2,705,448
TILLAGE DISC
Original Filed July 10, 1951     3 Sheets-Sheet 2

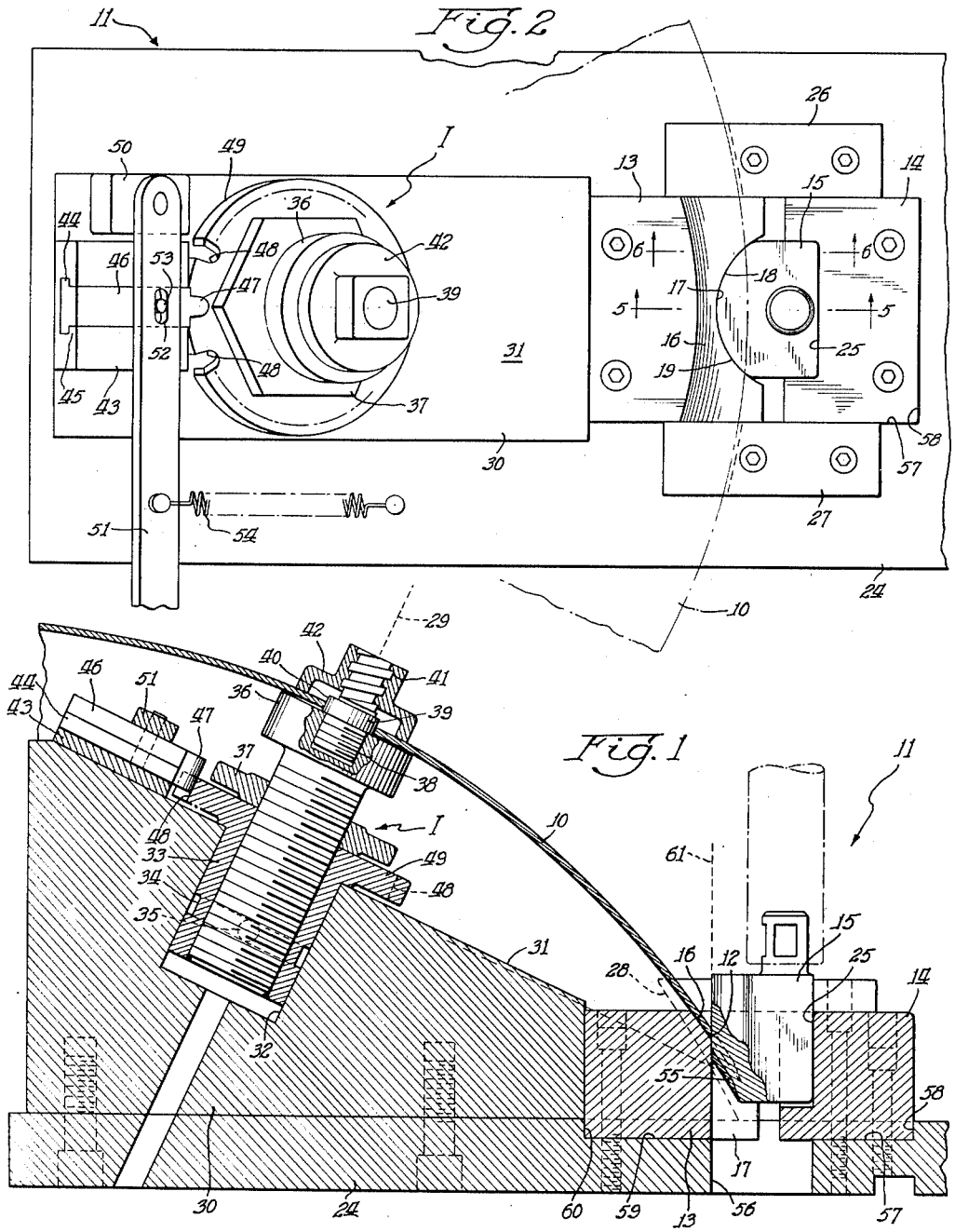

Inventor:
James H. Ingersoll
By: Frank C. Parker
Atty.

April 5, 1955  J. H. INGERSOLL  2,705,448
TILLAGE DISC
Original Filed July 10, 1951  3 Sheets-Sheet 3
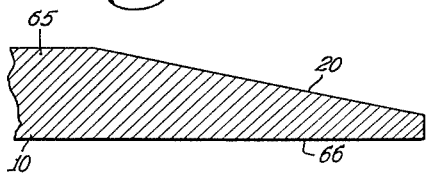
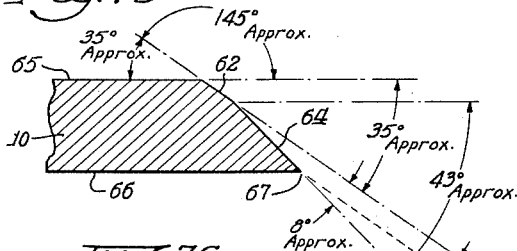
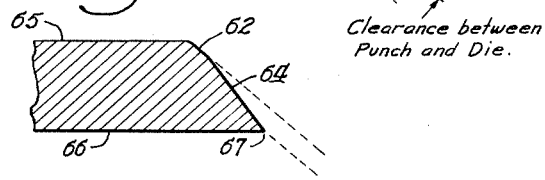
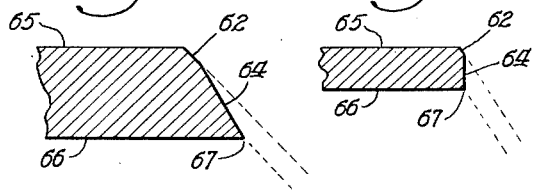
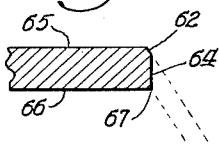
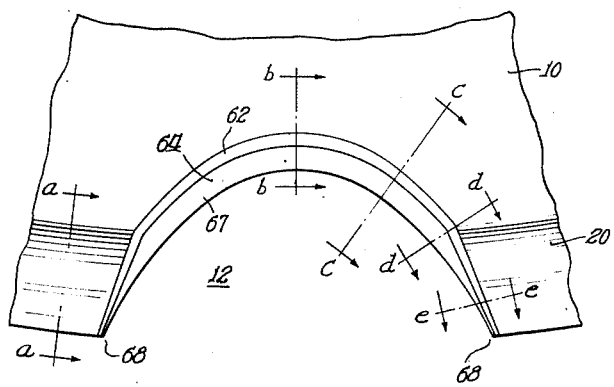
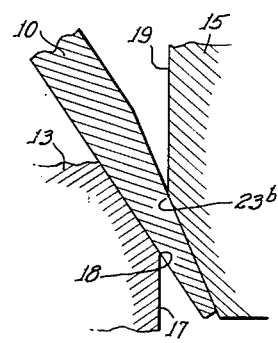
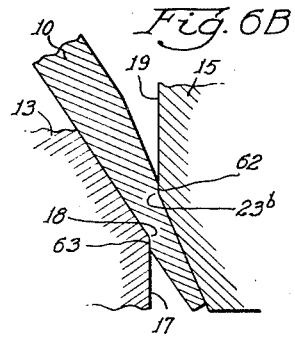
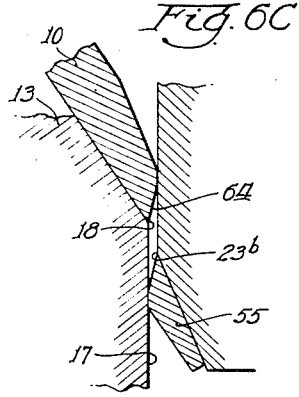
Inventor:
James H. Ingersoll
By Frank C. Parker
Atty.

United States Patent Office 2,705,448
Patented Apr. 5, 1955

2,705,448

TILLAGE DISC

James H. Ingersoll, Flossmoor, Ill., assignor to Borg-Warner Corporation, Chicago, Ill., a corporation of Illinois Original application July 10, 1951, Serial No. 236,004. Divided and this application July 10, 1951, Serial No. 236,005

6 Claims. (Cl. 97—217)

The present invention relates in its broadest aspects to sheet metal articles and more specifically to an improved high carbon steel earth cutting disc particularly applicable to agricultural implements and the machine or fixture and method for making such a disc with spaced peripheral recesses defined by surfaces which converge with one side of the disc to provide sharp cutting edges.

Although the present application fully discloses the fixture and method for making the new and improved earth cutting disc, only the disc per se is claimed herein, the disclosure of the fixture and method for making the disc being deemed to facilitate a complete and thorough understanding of the new and improved disc. The fixture and method for making the disc are disclosed and claimed in my copending application, Serial No. 236,004, filed July 10, 1951, the present application being a division of the last-mentioned application which covers the fixture and method for making the disc.

For a considerable period of time it has been a rather common practice to utilize implements, for agricultural and other types of earth working and cutting purposes, comprising steel discs for breaking up and working the earth, which, when the implement is being used for agricultural purposes is very effective in rendering the soil more suitable for planting. In such implements it is customary, in at least one type thereof, to arrange a plurality of the discs upon a common axis such that the complete implement may be pulled over the earth with the axis of the discs positioned at an angle somewhat less than 90° from the line of forward movement of the implement. The discs are somewhat concave and when the implement is used in this manner the individual discs, although tending to roll to a certain extent, also cut or dig into the soil thereby turning it over and breaking it up as is particularly necessary before a crop may be planted. More recently an improved form of such implements has utilized discs that are provided with notches around their peripheries. The periphery of each individual disc in these improved implements is tapered slightly in order to facilitate the entrance of the disc into the soil and the periphery of the individual notches in each of the discs is sharpened in order to further facilitate the cutting and working up of the earth. Such an improved earth working implement has been found to be very effective as a device for conditioning the earth prior to planting a crop therein or prior to an engineering operation requiring the removal of a layer of earth.

The notched discs utilized in the improved type of earth cutting implement referred to briefly in the preceding paragraph have quite generally been manufactured in a rather uneconomical manner, as heretofore the notches have been punched by a punch that passes through the disc periphery, travelling through a path substantially normal to the sides of the disc, thereby leaving a land for each notch which must be ground off to provide the cutting edge. Quite generally the friction during the grinding operation necessary to remove the land and produce the cutting edge for each notch heats the portions of the disc surrounding the notch to such an extent that the metallurgical characteristics of the metal surrounding the notch are considerably changed. As is well known, it frequently happens, during the grinding operation, that the temperature of the disc in the vicinity of the notch periphery increases to a value above the critical point for the material of which the disc is made and as a result the temper of the disc around the notch periphery is withdrawn. Subsequently, the disc, which is punched and ground under normal atmospheric conditions, becomes air cooled. During this air cooling of the portion of the disc subjected to heating by the grinding operation the temper is restored but it has been found that in at least a rather high percentage of cases unstable martensitic steel is formed on the sharp edge bounding the notch or recess. As is well known, this unstable martensitic steel is very hard and brittle and is particularly subject to surface cracking.

Due to the fact that the grinding period is not absolutely definite, and because the notch peripheries are heated to different temperatures and since the temperature of the notch peripheries is a function of the thickness of the metal in contact with the grinding wheel, there is usually a temperature gradient from a high value at the sharpest point of the notch periphery toward the center of the disc. As a result of this temperature gradient, the subsequent cooling, due to what might be called, air quenching, causes a gradient in the hardness of the cutting edges, which is present in a very high percentage of the earth cutting discs that are notched in the conventional manner.

Earth cutting discs manufactured in the conventional manner wherein the notch peripheries are ground after being punched in order to provide sharp cutting edges for each notch, have been found in many instances, when the discs are actually put to use, to be inferior. As has been pointed out heretofore, the subsequent air cooling after the grinding operation often may cause unstable martensitic steel to be formed at the cutting edges and also it is not uncommon for some of the cutting edges to comprise a steel that is softer than the remaining portions of the disc. If the cutting edges are harder than the other portions of the disc they are more brittle and far more subject to breaking when the disc strikes a relatively heavy object. Such a break very often extends generally radially inwardly of the disc several inches in the form of a crack and, as is obvious, such a crack severely weakens the disc. When the cutting edges are softer than the remaining portions of the disc they tend to become dull and wear away rapidly, which is also unsatisfactory. When the cutting edges are of substantially the same hardness as the rest of the disc the cracking of the disc in a generally radial or chordal direction is considerably lessened and a much more satisfactory and longer wearing earth-cutting disc is thereby provided.

The principal object of the present invention is therefore to provide an earth-cutting disc, having a notched periphery, wherein each of the notches is defined by a surface that converges with one side of the disc to provide a cutting edge and wherein the disc is made of a steel of substantially the same hardness throughout.

Another important object of the invention is to provide a hard steel earth-cutting disc having a scalloped cutting edge formed by merely shearing a plurality of recesses in the disc periphery at an acute angle with respect to the sides of the disc, thereby eliminating the grinding operation necessary to provide the cutting edge for each of the recesses in discs made by conventional methods.

Another object of the present invention is to provide an earth-cutting disc that is substantially circular and slightly concave, one side of which is tapered slightly in the vicinity of the periphery of the disc to provide a relatively blunt cutting edge around the disc periphery, and the periphery of the disc is also provided with a plurality of uniformly spaced sheared beveled notches.

Another object of the present invention is to provide an earth-cutting disc which has one side that is tapered slightly around the periphery thereof, and which has a plurality of sheared open-mouthed spaced peripheral notches, the peripheries of each of the notches intersecting one side of the disc at a variable acute angle which is sharpest at the radially deepest portion of the notch and which increases and approaches a right angle at the ends of the respective notches where the notch peripheries intersect the tapered disc periphery.

Another object of the invention is to provide an earth-cutting implement having an open-mouthed peripheral notch formed by passing a punch through the implement in a manner such that the punch intersects the periphery of the implement and travels through a path making an acute angle with the surface of the implement first engaged by the punch to thereby provide a cutting edge for the notch.

A further object of the invention is to provide an earth-cutting disc having a tapered peripheral portion and having a recess in the peripheral portion which is defined by a substantially generally elliptically shaped continuously curved sheared surface that meets one side of the disc at a variable acute angle to thereby form a cutting edge.

Another object of the invention is to provide a high carbon steel earth cutting disc having opposed sides, one of which is substantially uniformly tapered around its periphery, and having a plurality of spaced sheared open-mouthed recesses formed in the peripheral portion of the disc, each of the recesses having a radial depth greater than the radial width of the taper on the one side of the disc and being defined by a substantially continuously curved sheared surface that meets one side of the disc at a variable acute angle to thereby form a cutting edge for each recess, the acute angle having its smallest value at the radially deepest point on the cutting edge and gradually increasing and approaching at right angle at the ends of the curved sheared surfaces where they intersect the tapered disc periphery.

A further object of the invention is to provide an agricultural earth cutting disc having one side peripherally tapered to provide a relatively blunt cutting edge around the periphery of the disc and having a plurality of relatively sharper substantially continuously curved sheared recessed portions formed in its periphery, each of the recessed portions being defined by a surface that intersects the other side of the disc at a relatively sharp acute angle in the central part of the recessed portions and at a relatively less acute angle at the ends of the recessed portions so as to provide sufficient disc thickness at the junctures of the recessed portions and the tapered periphery of the disc as will not weaken the disc at the junctures.

Another object of the invention is to provide a tempered sheet metal earth cutting disc having a peripheral portion formed with an open continuously curved recess therein which is defined by a pair of intersecting compression and shear surfaces formed by passing a punch through the peripheral portion of the disc in a path making an acute angle to the sides of the disc and such that the punch intersects the outer periphery of the disc, the compression surface meeting one side of the disc at an obtuse angle and the sheared surface meeting the other side of the disc at a variable angle sufficiently acute to provide a cutting edge.

More specifically it is an object of the present invention to provide a steel earth cutting disc having a diameter of the order of between 16 and 40 inches and a thickness of the order of between ⅛ and ½ inch, wherein the disc periphery is scalloped by passing a punch therethrough at an acute angle to the sides of the disc to provide spaced recessed cutting edges around the disc periphery.

The above and numerous other objects and advantages of the present invention will become apparent from the following detailed description when read in conjunction with the accompanying drawings, wherein:

Fig. 1 is a sectional view showing the fixture for shearing beveled notches in the periphery of a high carbon steel earth-cutting disc;

Fig. 2 is a plan view of the fixture shown in Fig. 1;

Figs. 6A, 6B and 6C are fragmentary sectional views taken substantially along the line 6—6 in Fig. 2 and looking in the direction of the arrows, and also respectively correspond to different positions of the punch during the notching operation;

Fig. 7 is a fragmentary plan view of a disc showing a notch therein formed by the fixture disclosed in Figs. 1 and 2;

Fig. 7A is a sectional view taken substantially along the line a—a in Fig. 7;

Fig. 7B is a sectional view taken substantially along the line b—b in Fig. 7;

Fig. 7C is a sectional view taken substantially along the line c—c in Fig. 7;

Fig. 7D is a sectional view taken substantially along the line d—d in Fig. 7; and Fig. 7E is a sectional view taken substantially along the line e—e in Fig. 7.

Figure 3:
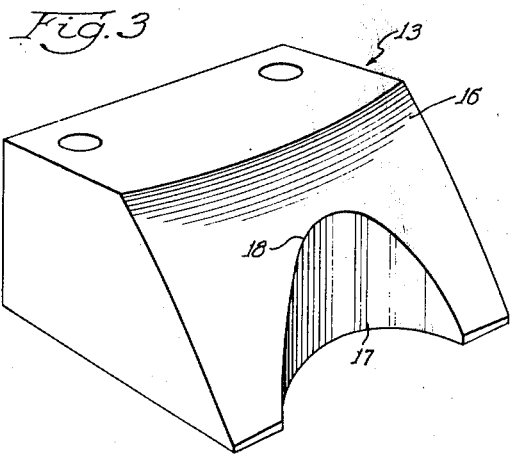
Fig. 3 is a perspective view of the die employed in the disc notching fixture shown in Figs. 1 and 2.
Figure 4:
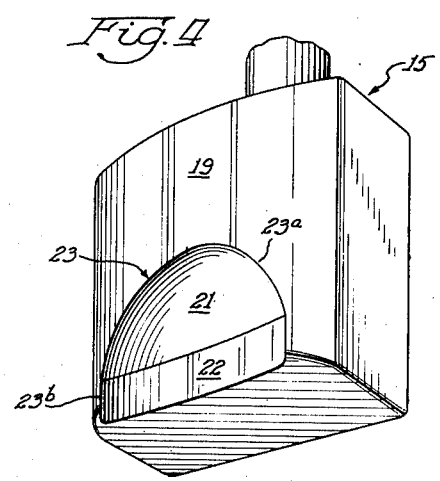
Fig. 4 is a perspective view of the punch employed in the disc notching fixture.

Referring now to the drawings, wherein like reference numerals in the different views identify identical parts throughout, and referring particularly to Figs. 1, 2 and 7, a slightly concave, generally circular high carbon steel earth-cutting disc 10 is rotatably positionable in the notching fixture, indicated generally by reference numeral 11, in order to provide a plurality of semi-elliptical open-mouthed recesses or notches 12 in the periphery of the disc 10. The fixture 11, in general, comprises a relatively stationary die 13, a back-up guide member 14, a reciprocable punch member 15, and an indexing mechanism I for rotatably positioning the disc 10 so as to bring successive peripheral portions thereof into punching position and thereafter hold the disc in the proper position during the punching operation.

As shown particularly in Figs. 1 and 3, the die 13 comprises a block of hard metal having one of its upper edges cut off to provide a disc supporting surface 16. As the disc 10 is slightly concave, the surface 16 is slightly convex so as to be substantially complementary to the under side of the disc 10. It will be understood, of course, that the degree of convexity of the surface 16 depends upon the degree of concavity of the disc 10 and it is contemplated to be within the realm of the present invention, that when a substantially planar disc is being notched, the disc supporting surface 16 will also be substantially planar so as to be complementary to such a disc.

The die 13 is also provided with a punch guiding surface 17 which is substantially semi-cylindrical and which intersects the disc supporting surface 16 to provide a combined shearing, back-up and compression edge 18 on the die 13. The combined shearing, back-up and compression edge 18, being defined by the line of intersection between the punch guiding surface 17 and the disc supporting surface 16, comprises a continuously curved edge having a substantially semi-elliptical shape. The edge 18 varies from a true ellipse only because of the convex character of the surface 16. As will be brought out more fully hereinafter, the shape of the edge 18 is critical in that it is important that it makes line contact with the under surface of the disc 10 at all points throughout the length of the edge 18. However, it is not critical that the rest of the surface 16 engage the under surface of the disc 10 at all points on the surface, it being sufficient that the surface 16 substantially conform to the under surface of disc 10, so as to firmly support the disc.

The punch 15 comprises a block of hard metal formed with a cylindrical surface 19 substantially complementary to the cylindrical punch guiding surface 17 formed on the die 13. The radius of curvature of the cylindrical surface 19 on the punch 15 is, however, sufficiently smaller than the radius of curvature of the surface 17 on the die 13 to provide the necessary clearance between the punch 15 and the die 13 when the punch is moved downwardly into the die. As is best shown in Figs. 7 and 7A the upper surface of the disc 10 is slightly tapered, as at 20, and the cylindrical portion 19 of the punch 15 is cut off so that the lower surface of the punch is substantially complementary to the peripheral portion of the disc 10 when the punch 15 is moved into engagement with the disc. Since the punch 15 is cut off in this manner, two surfaces 21 and 22 are provided on the lower end of the punch 15, the surface 21 being substantially complementary to the upper surface of the disc and the surface 22 being substantially complementary to the tapered peripheral surface 20 of the disc 10. The two surfaces 21 and 22 both intersect the cylindrical surface 19 of the punch 15 to provide a combined compression and shearing edge 23 for line contacting the upper surface of the disc 10 when the punch 15 is moved into engagement therewith. The compression and shearing edge 23 is composed of one part 23a formed by the intersection of the surfaces 21 and 19, and of two parts 23b formed by the two intersections between the surfaces 22 and 19. As will also appear hereinafter, it is important that the combined compression and shearing edge 23 makes line contact with the upper surface of the disc 10 at all points throughout its length when the punch 15 is moved into engagement with the disc, however, it is not critical whether the remaining portions of the surfaces 21 and 22 be any more accurately formed than is sufficient to provide substantial engagement with the upper surface of the disc 10 throughout these surfaces.

The back-up reaction guide member 14, as well as the die 13, is suitably bolted to a main base plate 24. The guide member 14 is cut out so as to provide a guiding surface 25 that is complementary to the punch 15 and serves to back-up the punch 15 upon movement thereof downwardly through the disc 10. The internal dimensions of the guiding surface 25 are larger than the external dimensions of the punch 15 by an amount sufficient only to permit free sliding movement of the punch in the guiding member 14. It is not necessary that there be any great amount of clearance between the punch 15 and the back-up member 14 because, in fact, the punch 15 is urged against the back-up member 14 during movement of the punch downwardly through the disc 10 by a rather considerable force, the guide member 14 serving at this time as a reaction member.

Also bolted to the base plate 24 is a pair of disc positioning members 26 and 27, each of which is provided with a surface 28 that is substantially complementary to the upper surface of the disc 10 and which, in conjunction with the disc supporting surface 16 on the die 13, serves to maintain the peripheral portion of the disc 10 in a vertically stationary position.

The indexing mechanism I for angularly positioning the disc 10 about its own axis, indicated by the dotted line 29, is mounted on a block 30 rigidly bolted to the base plate 24. The block 30 has an upper beveled surface 31 and has a cylindrical opening 32 that extends through the beveled surface 31 in a direction substantially perpendicular to the beveled surface 31. Rotatably positioned within the opening 32 is a cylindrical sleeve 33 which is provided with an annular groove 34 for receiving a stud 35 which retains the sleeve 33 in the proper vertical position. The sleeve 33 is internally threaded and receives a disc supporting member 36 which has mating external threads engageable by the internal threads on the sleeve 33. A lock nut 37 is also threaded onto the threaded portion of the disc supporting member 36 for the purpose of rigidly clamping together the disc supporting member 36 and the sleeve 33. The member 36 is internally bored and threaded, as indicated at 38, for the purpose of receiving a disc locating bolt 39. The bolt 39 has a central shoulder 40 for seating the disc 10 and is externally threaded, as at 41, on its upper portion. A collar-like member 42 is internally threaded to mate with the threads 41 in order to clamp the disc 10 against the supporting member 36. When the lock-nut 37 is screwed down against the sleeve 33 and the collar 42 is screwed down against the disc 10, all of these members comprise a single rotatable unit.

Means are provided for holding the disc 10, supporting member 36 and sleeve 33 stationary in any desired angular position so as to bring successive peripheral portions of the disc 10 into a position to be notched by the punch 15 and die 13. Such means will now be described. A block 43 is secured to the block 30 and is formed with a track 44 having overhanging lips 45 for receiving and holding a latch 46 therein. The latch 46 is slidable in the track 44 and has a tooth 47 which is movable into any one of a plurality of slots 48 formed around the periphery of a flange 49 on the sleeve 33. When the tooth 47 is seated within one of the slots 48, the sleeve 33, supporting member 36 and disc 10 are held fixed angularly about the axis 29 of the disc 10. A block 50 is secured to the block 11 and pivotally supports a manually movable lever 51. The lever 51 is provided with a slot 52 and a pin 53, secured to the latch 46, extends through the slot 52. A tension spring 54, secured at one end to the lever 51 and secured at its other end to the block 30 biases the latch 46 into the position shown in Fig. 2, wherein the tooth 47 is seated within one of the slots 48 formed in the flange 49. Upon the manual movement of the lever 51 in a clockwise direction (see Fig. 2) the latch 46 is withdrawn so that the disc 10, supporting member 36 and sleeve 33 may be rotated until the next successive notch 48 is opposite the tooth 47. The tooth 47 is spring urged by the tension spring 54 so that it enters the next slot 48 and this positions the disc 10 such that the next peripheral portion to be notched by the punch 15 and die 13 is properly aligned between the punch and die.

When the disc 10 is held in an angularly fixed position about its own axis 29 and with its peripheral portion supported by the die supporting surface 16 and held on the die supporting surface 16 by means of the two surfaces 28 on the disc positioning members 26 and 27, vertical downward movement of the punch 15, when sufficient force is applied to the punch 15, causes a slug 55 to be punched out of the disc to thereby form the notch 12 in the periphery of the disc. The base plate 24 has an opening 56 therein and the slug 55, when punched out of the disc 10, drops through the opening 56. It is to be borne in mind that the present fixture is adapted to angle notch steel earth cutting discs having a thickness of the order of between one-eighth and one-half inch. Accordingly, the pressure required to move the punch through the disc 10 is of the order of upwards of 15 tons depending upon the thickness of the disc 10 and the size of the notch 12 to be formed therein. Due to the fact that the punch 15 passes through the disc 10 at an acute angle, the resistance of the disc to being punched causes a lateral component of force to be applied to the punch 15, which tends to move it to the right (as viewed in Fig. 1). Inasmuch as the punch 15 abuts the reaction guide member 14, lateral horizontal movement of the punch is prevented. It will be noted that the base plate 24 is provided with a recess 57 having a shoulder 58 against which the reaction guide member 14 is seated in order to insure that the reaction guide member 14 itself will not also be moved due to the lateral force acting upon the punch 15. Since the punch 15 strikes the disc 10 at an acute angle there is also a component of force acting toward the left on the die 13 and the die 13 is also set into a recess 59 in the base plate 24 and abuts a shoulder 60 so as to maintain the die 13 fixed with respect to the base plate 24.

Figure 5A:
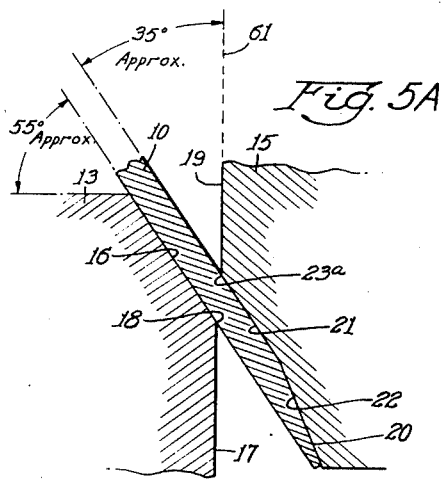
Figs. 5A, 5B and 5C are fragmentary sectional views taken substantially along the line 5—5 in Fig. 2 and respectively correspond to different positions of the punch during the notching operation.

Proceeding now with a description of the operation of the present angle notching fixture, the peripheral portion of the disc 10 positioned between the punch 15 and die 13 lies at an acute angle with respect to a line of reciprocation of the punch 15, indicated by the dotted line 61. This acute angle is shown in Fig. 5A as being approximately equal to 35 degrees. It will, of course, be understood, however, that the magnitude of the acute angle between the disc 10 and the line of reciprocation 61 of the punch 15 will depend upon the degree of bevel or sharpness desired to be imparted to the notch 12. A smaller angle between the disc surface and the line of reciprocation 61 will cause a sharper cutting edge to be formed and a greater angle will cause a duller or more blunt cutting edge to be formed.

When the disc 10 is positioned between the punch 15 and the die 13 and the punch 15 is moved downwardly to the point where it just engages the upper surface of the disc 10, the compression and shearing edges 23a and 23b respectively make line contact with the upper surface of the disc, the edges 23b line contacting the tapered portion 20 of the disc periphery and the edge 23a line contacting the untapered portion of the disc. At this same time the combined shearing, back-up and compression edge 18 on the die 13 also makes line contact with the under surface of the disc 10.

Figure 5B:
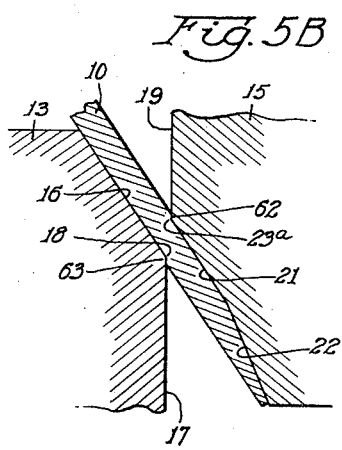
Figure 5C:
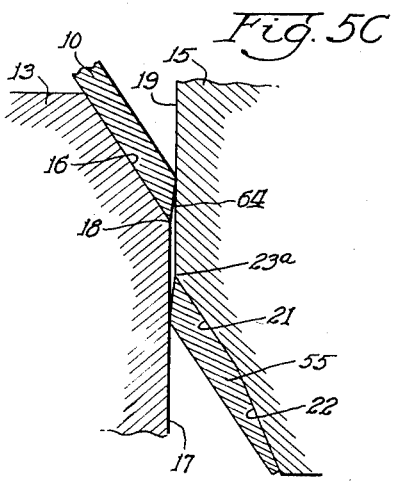

Upon initial movement of the punch 15 downwardly into the disc 10 until it reaches approximately the position shown in Fig. 5B or 6B metal failure of the upper portion of the disc 10 occurs along a compression surface 62 which is complementary to the cylindrical surface 19 of the punch 15. At the same time metal failure of the lower portion of the disc 10 occurs along a compression surface 63 which is complementary to the cylindrical surface 17 on the die 13.

Further downward movement of the punch 15 beyond the position thereof shown in Figs. 5B and 6B causes metal failure along a shear surface 64 thereby completely severing the slug 55 from the remainder of the disc 10. The slug 55 drops out through the opening 56 in the base plate 24 and the punch 15 is withdrawn upwardly. The shear surface 64 is a continuously curved surface which intersects the compression surface 62 and which passes through each point on the lower surface of the disc 10 that is line contacted by the shearing, back-up and compression edge 18.

Inasmuch as the surface 19 on the punch 15 and the surface 17 on the die 13 are both cylindrical, the general contour of the periphery of the notch 12 defined by the compression surface 62 and the shear surface 64 is elliptical. The compression surface 62 is substantially complementary to the cylindrical surface 19 of the punch 15 and therefore it is a semi-cylindrical surface intersecting the upper surface 65 of the disc 10 at an angle of approximately 145 degrees, which is the complement of the angle between the disc 10 and the line of reciprocation of the punch 15. As will be apparent from Figs. 7B, C, D and E, the angle of intersection between the compression surface 62 and the upper surface 65 of the disc 10 decreases from an obtuse angle of approximately 145 degrees at the mid-point or radially deepest point of the periphery of the notch 12 (represented by the sectional view shown in Fig. 7B and approaches an angle of slightly greater than 90 degrees at the intersection of the compression surface 62 with the periphery of the disc 10.

The shear surface 64 is a semi-frusto-conical surface rather than a true semi-cylindrical surface by reason of the fact that a certain amount of clearance between the punch surface 19 and the die surface 17 is necessary. The shear surface 64 therefore converges with or intersects the lower surface 66 of the disc 10 at a variable acute angle in order to provide a cutting edge 67. The cutting edge 67, as is apparent from Figs. 7B–E, is sharpest in the radially deepest portion of the notch 12 and becomes duller proceeding toward the terminals (indicated by reference numerals 68) of the notch 12 where the notch defining surfaces 62 and 64 intersect the disc periphery. Since it is contemplated that the disc 10 will be utilized as an earth-cutting disc primarily, it is not essential that the periphery of the disc be keen to the point of having a razor-like cutting edge, it only being necessary that the periphery of the disc 10 be sufficiently sharp to cut through the earth which it is desired to work up. Rather than having a keen cutting edge at the periphery of the disc 10 it is more important that there be sufficient thickness of the disc at the periphery so that strength will not be sacrificed. Consequently, by providing the notch 12 with a peripheral cutting edge that is sharpest in its medial or central portion and progressively becomes duller at its terminal portions, the elliptically curved cutting edge is sufficiently sharp for working up the soil and is sufficiently thick to provide the necessary strength at the edge of the disc 10.

It has already been pointed out how the edges 18 and 23 on the die 13 and punch 15, respectively, function initially to cause metal failure of the disc 10 by compression and subsequently to cause metal failure of the disc 10 by shear, upon movement of the punch 15 through the disc 10, and it should be noted here that the edge 18 on the die 13 also performs another very important function. This function of the combined shearing, back-up and compression edge 18 is that it functions to back up the disc 10 upon passage of the punch 15 therethrough in order to insure that a clean shear, such as will provide a smooth and continuously curved sheared surface 64, will always be effected. Due to the continuous line contact between the shearing, back-up and compression edge 18 and the under surface 65 of the disc 10, there is no tendency of the disc 10 to break raggedly upon passage of the punch 15 therethrough. When metal failure is sought to be effected through sheet metal, along a surface that makes an acute angle with one surface of the sheet, a distinct problem is encountered which arises from the fact that metal failure is sought to be produced along a surface wider than the thickness of the metal. The natural tendency is for the metal to break along a surface substantially at right angles to the sides of the sheet and in the present application such a result is entirely undesirable. By providing the combined shearing, back-up and compression edge 18 the metal immediately surrounding the periphery of the notch to be subsequently formed is backed up and prevented from yielding, and consequently breakage of the metal at the notched periphery along a surface which might tend to make a right angle with one of the sides of the disc 10, is rendered substantially impossible.

Another problem encountered in angle notching sheet metal at the periphery thereof, is that problem resulting from the tendency of the punch to slip or be forced in a horizontal direction away from the metal being punched. When this is allowed to take place the compression surface which corresponds to the compression surface 62 in the disc 10 is not a surface that is truly complementary to the punch surface 19, but instead, is very likely to be an uneven surface more nearly parallel to the sides of the disc. The back-up guide member 14, by preventing a horizontal shift of the punch 15 during passage of the punch through the disc 10, serves to insure that the compression surface 62 will be precisely formed and complementary to the cylindrical surface 19 of the punch 15.

The present invention therefore discloses a high carbon steel disc having a tapered periphery and having its periphery angle notched to provide a cutting edge of sufficient keenness to enable the disc to cut earth when it is utilized in an earth-working implement. Further, the present invention discloses a fixture and method for providing the notches in the periphery of a high carbon steel earth-cutting disc wherein the notches are defined by a generally elliptical crescent shaped sheared surface which intersects one side of the disc at an acute angle to thereby provide a cutting edge around the periphery of the notch. Further, the use of a semi-cylindrical punch for providing the notches, in a manner such that the punch intersects the tapered periphery of the disc, is particularly advantageous in that the sheared surface formed by such a punch intersects one side of the disc at a rather blunt angle at the periphery of the disc to thereby still retain sufficient disc thickness as will afford the necessary strength of the disc at the notch terminals.

The present invention therefore provides an improved earth-cutting disc and an improved method and fixture for forming scalloped cutting edges in the periphery of such a disc without utilizing a grinding operation to sharpen the cutting edges after the disc is peripherally punched to form the scalloped periphery thereof. The combination of parts in the notching fixture comprising the combined shearing, back-up and compression edge on the die, the complementary compression and shearing surface on the punch, the back-up reaction guide member for the punch and the means for supporting the tapered periphery of the tempered sheet metal disc at an angle to the path of travel of the punch are all critical to the formation of the new and improved earth-cutting disc.

Although specific values have been utilized in describing the present invention, in particular with respect to the angle between the sides of the disc and the line of reciprocation of the punch and also with respect to the hardness of the steel of which the disc is made, it is to be borne in mind that these values have been found to be satisfactory and have been set forth specifically to illustrate a specific example of the form of disc disclosed herein. It is contemplated that numerous changes may be made in this respect particularly and in other respects without departing from the spirit or scope of the invention.

What is claimed is:

1. A hard sheet metal object having a tapered peripheral portion and having a recess in its peripheral portion, said recess being defined by a substantially continuously curved sheared surface meeting one side of the object at a variable acute angle to thereby form a cutting edge, said acute angle having the smallest value at the radially deepest point on the cutting edge and gradually increasing in value and approaching a right angle at the ends of said curved sheared surface.

2. A high carbon steel earth cutting disc having opposed sides one of which is substantially uniformly tapered around its periphery, and having a sheared open mouthed recess formed in its peripheral portion, said recess having a radial depth greater than the radial width of the taper on said one side of the disc and being defined by a substantially continuously curved surface meeting one of the sides of the disc at a variable acute angle to thereby form a cutting edge, said acute angle having the smallest value at the radially deepest point on the cutting edge and gradually increasing and approaching a right angle at the ends of said curved sheared surface.

3. A high carbon steel concave earth cutting disc having one side thereof peripherally tapered to provide a relatively blunt cutting edge on the periphery of the disc and having a notch formed in its peripheral portion, said notch being defined by a sheared surface that intersects the other side of the disc at a relatively small acute angle in the central portions of the notch and at a relatively large acute angle at the terminal portions of the notch so as to provide a relatively sharper cutting edge around the notch and still maintain sufficient disc thickness at the junctures of the notch and the tapered periphery of the disc as will not weaken the disc at said junctures.

4. A tempered sheet metal earth cutting disc the diameter of which is greater than 20 times the thickness of the disc, said disc having a generally semi-elliptically shaped notch in its peripheral portion, said notch being defined by a pair of intersecting surfaces each of which intersects the periphery of the disc, one of said surfaces comprising a punch compressed surface meeting one side of the disc at an obtuse angle and the other of said surfaces comprising a punch sheared surface meeting the other side of said disc at a variable angle sufficiently acute to provide a cutting edge.

5. A tempered sheet metal earth cutting disc having a peripheral portion formed with an open continuously curved recess therein, said recess being defined by a pair of intersecting punch compressed and punch sheared surfaces, the punch compressed surface comprising a surface intersecting one side of the disc at a variable obtuse angle of the order of 140° to 150° in the medial portions of the punch compressed surface and gradually decreasing and approaching a right angle at the terminal portions thereof, and the punch sheared surface meeting the other side of the disc at an acute angle of the order of 35° to 45° in the medial portions thereof and gradually increasing and approaching a right angle at the terminal portions thereof to provide a cutting edge for the recess.

6. In a metal earth cutting disc having a tapered periphery, a curved recess in said periphery defined by a generally crescent shaped sheared surface, said surface converging with one side of said disc at an angle that varies proceeding inwardly from the periphery of said disc from substantially a right angle at the relatively thin periphery of the disc to a relatively sharply acute angle at the radially inner portion of the convergence to define with said one side an earth cutting edge.

References Cited in the file of this patent

UNITED STATES PATENTS

| | | |
|---|---|---|
| 341,461 | Dicus | May 11, 1886 |
| 945,274 | Hanger | Jan. 4, 1910 |
| 1,214,882 | Bessant | Feb. 6, 1917 |
| 1,506,719 | Thuau | Aug. 26, 1924 |
| 1,728,192 | Wellington | Sept. 17, 1929 |